United States Patent
Giannetti (10) Patent No.: US 10,632,583 B1
(45) Date of Patent: Apr. 28, 2020

(54) THROUGH-COOLANT VIBRATION DAMPENED MACHINE TOOL HAVING RESILIENT DAMPENING SYSTEM

(71) Applicant: Enrico R. Giannetti, East Bernard, TX (US)

(72) Inventor: Enrico R. Giannetti, East Bernard, TX (US)

(*) Notice: Subject to any disclaimer, the term of this patent is extended or adjusted under 35 U.S.C. 154(b) by 2 days.

(21) Appl. No.: 16/214,874

(22) Filed: Dec. 10, 2018

(51) Int. Cl.
| B23Q 11/00 | (2006.01) |
| B23B 27/00 | (2006.01) |
| B23Q 11/10 | (2006.01) |
| F16F 15/28 | (2006.01) |

(52) U.S. Cl.
CPC ........ *B23Q 11/0035* (2013.01); *B23B 27/002* (2013.01); *B23Q 11/0039* (2013.01); *B23Q 11/1023* (2013.01); *F16F 15/28* (2013.01); *B23B 2250/16* (2013.01); *Y10S 82/904* (2013.01); *Y10T 408/76* (2015.01); *Y10T 409/304312* (2015.01)

(58) Field of Classification Search
CPC ......... Y10T 409/304312; Y10T 408/76; Y10T 82/2585; Y10T 82/2589; Y10T 82/2591; Y10S 82/904; B23Q 11/0032; B23Q 11/0035; B23Q 11/0039; F16F 15/28; B23B 27/002; B23B 29/022; B23B 2250/16; B23B 2260/004
USPC ........... 409/141; 408/143; 82/158, 160, 161, 82/904
See application file for complete search history.

(56) References Cited

U.S. PATENT DOCUMENTS

| 3,242,791 A * | 3/1966 | Smith | ...................... F16F 7/108 |
| | | | 188/379 |
| 3,774,730 A * | 11/1973 | Maddux | ................ B23B 29/022 |
| | | | 188/379 |
| 4,385,665 A * | 5/1983 | Knoll | ...................... B25D 17/24 |
| | | | 173/162.1 |

(Continued)

FOREIGN PATENT DOCUMENTS

| CA | 2396366 A1 * | 7/2001 | .............. F16F 7/104 |
| WO | WO-2014202869 A1 * | 12/2014 | ........... B23B 27/002 |

*Primary Examiner* — Sunil K Singh
*Assistant Examiner* — Michael Vitale
(74) *Attorney, Agent, or Firm* — James L. Jackson (57) ABSTRACT

A resonant frequency dampened through-coolant machine tool for selective mounting to machining systems for precision vibration free machining and has an elongate tool body. An internal dampening chamber is defined within the machine tool body and contains a resonant frequency dampening mass that is moveable within the dampening chamber. Axial and diametrical tunable dampening devices support the dampening mass in spaced relation with internal walls of the dampening chamber. A tuning piston is moveable within the machine tool body and has a tuning flange that is disposed in contact with one of the axial tunable dampening devices. The tuning piston has a pair of oppositely angulated surfaces that are selectively engaged by angulated drive heads of adjustment screws that are supported by threaded openings of the tool body and are rotated to selectively drive the tuning piston forwardly or rearwardly for precise tuning activity. Internal components of the machine tool define a coolant fluid flow passage to conduct a jet of coolant fluid to the metal cutting interface.

18 Claims, 6 Drawing Sheets

(56) References Cited

U.S. PATENT DOCUMENTS

| | | | |
|---|---|---|---|
| 5,413,318 A * | 5/1995 | Andreassen | B23B 29/022 173/211 |
| 9,579,730 B2 * | 2/2017 | Frota De Souza Filho | B23B 29/022 |
| 9,993,879 B1 * | 6/2018 | Eichelberger | B23B 29/022 |
| 2003/0147707 A1 * | 8/2003 | Perkowski | F16F 7/10 407/30 |

* cited by examiner

THROUGH-COOLANT VIBRATION DAMPENED MACHINE TOOL HAVING RESILIENT DAMPENING SYSTEM

BACKGROUND OF THE INVENTION

Field of the Invention

The present invention relates generally to machine tools or tool holders for metal cutting and working machines. More particularly the present invention concerns tool holders including boring bars, threading tools, turning tools and the like, which because of their length and flexibility are often subject to significant vibration during rotary machining operations, such tool holders having a dampening system to substantially eliminate vibration during machining operations. This invention also concerns machine tools that have a through-coolant capability for conducting a flow of pressurized coolant fluid through internal passages of a machine tool and emitting the coolant as a jet or spray that is precisely directed to the cutting interface of a replaceable cutting insert with rotating metal stock for cooling and for removal of metal chips that have been cut from the rotating stock.

Description of the Prior Art

Machining vibration, typically referred to as "chatter", especially when relatively long and somewhat flexible machine tools such as boring bars are used, interferes with optimum machining activity and usually results in roughly machined surfaces and noisy machining operations when machining internal and external surfaces, threads and the like within or on metal stock that is rotated by a machining system. Numerous attempts have been made over an extensive period of time to achieve tuning of the dampening system of boring bars and other such machine tools to cancel the resonant frequency of the machine tools and thus minimize the vibration or chatter that interferes with optimum metal cutting operations such as boring, threading, turning and cutting.

Tool holders such as boring bars have been developed, as set forth in U.S. Pat. No. 3,774,730, that incorporate a dynamic vibration absorber having the capability for being dynamically tuned to dampen the resonant frequency of rotary machining vibration that causes tool chatter resulting in rough and noisy machining during rotary metal working activity. U.S. Pat. No. 6,443,673 discloses a tunable tool holder that has an absorber mass that is supported within a vibration dampening chamber between elastomer supports and employs a moveable and adjustable pressure plate for compressing the elastomer supports and dynamically tuning the tool holder to minimize the vibration or chatter that occurs during machining activity.

SUMMARY OF THE INVENTION

It is a principal feature of the present invention to provide a novel machine tool for supporting one or more replaceable cutter inserts and having a resonant frequency dampening system having the capability of being tuned by adjustment to minimize tool chatter during machining;

It is another feature of the present invention to provide a novel machine tool having an internal vibration absorbing mass for minimizing the presence of tool chatter or vibration during machining and having a tuning mechanism that is selectively adjustable by a machinist to essentially absorb or cancel the resonant frequency of the tool as needed to provide for smooth and efficient cutting of precision metal surfaces on a rotating work-piece.

It is another feature of the present invention of provide a novel vibration adjustable machine tool having an internal fluid flow passage through which pressurized coolant fluid from the coolant pump of a machining system is conducted through the machine tool and is emitted as a jet from one or more jet ports of a cutter support head and is precisely to the cutting interface of the replaceable cutter insert member with the work-piece being machined.

It is also a feature of this invention to provide a novel resonant frequency dampening system for the machine tool having a dampening mass that is supported within an internal chamber of the tool by elastomeric support members and having a dampening adjustment mechanism that causes precision dampening adjustment movement of the dampening mass and other internal components of the machine tool.

It is an ever further feature of the present invention to provide a novel resonant frequency dampened machine tool having a fixed body of dense material within the machine tool to enhance the dampening characteristics of the adjustable dampening system thereof.

Briefly, the various objects and features of the present invention are realized through the provision of an elongate machine tool holder mechanism, such as a boring bar, threading tool, turning tool or cutting tool, having a cutter support head to which a replaceable cutter insert is secured for machining. The machine tool defines an elongate internal chamber within which is located a vibration absorbing mass that is preferably composed of a dense material, such a carbide, or any other material having a density exceeding that of steel. The vibration absorbing mass is supported within the elongate internal chamber by annular resilient vibration dampening members that are positioned about end portions of the vibration absorbing mass so that the mass is supported in spaced relation with internal surfaces of the elongate internal chamber and other internal components of the machine tool.

An adjustment piston member is mounted for movement within the internal chamber of the tool and is capable of precision adjustment in either axial direction by means of tapered piston screws that engage correspondingly tapered recess surfaces of the adjustment piston member. The adjustment piston member is in contact with a resilient support member of the resonant frequency dampening mass and is thus capable of imparting adjustment force to the mass. The elongate body of the tool, the resonant frequency dampening mass and the adjustment piston member are each provided with axially aligned coolant flow passages for conducting pressurized coolant fluid through the tool to jet orifices of the cutter support head during machining activity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings.

DETAILED DESCRIPTION OF PREFERRED EMBODIMENT

Figure 1:
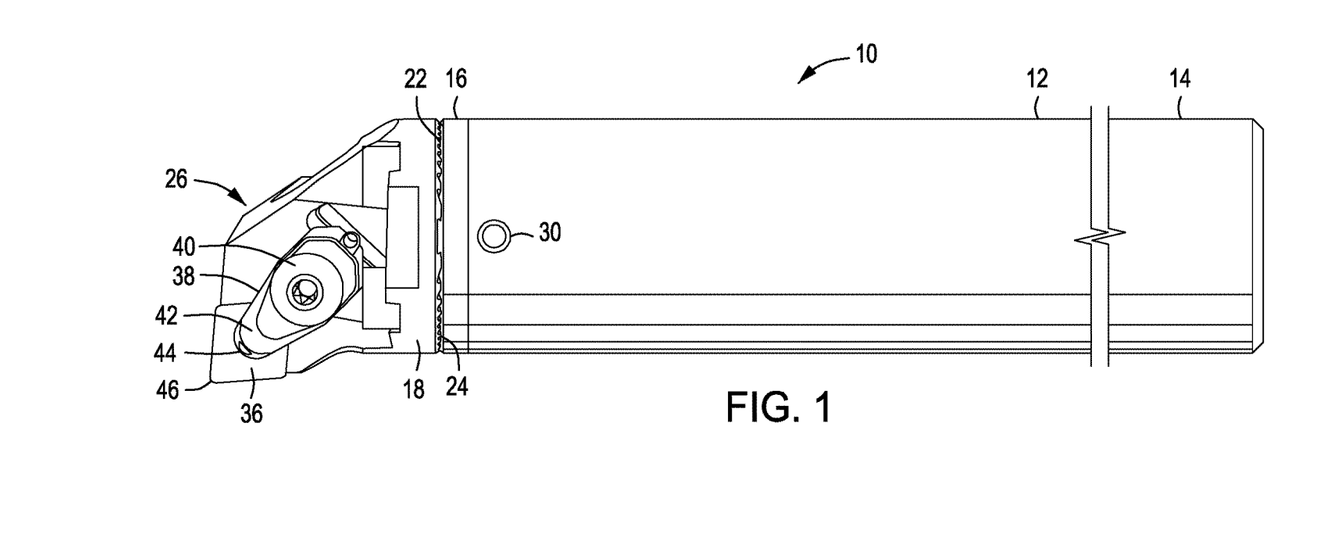
FIG. 1 is a top view illustrating a machine tool holder in the form of a through-coolant resonant frequency dampening boring bar that embodies the principles of the present invention and has a coolant jet emitting cutter support head mounted thereto.
Figure 2:
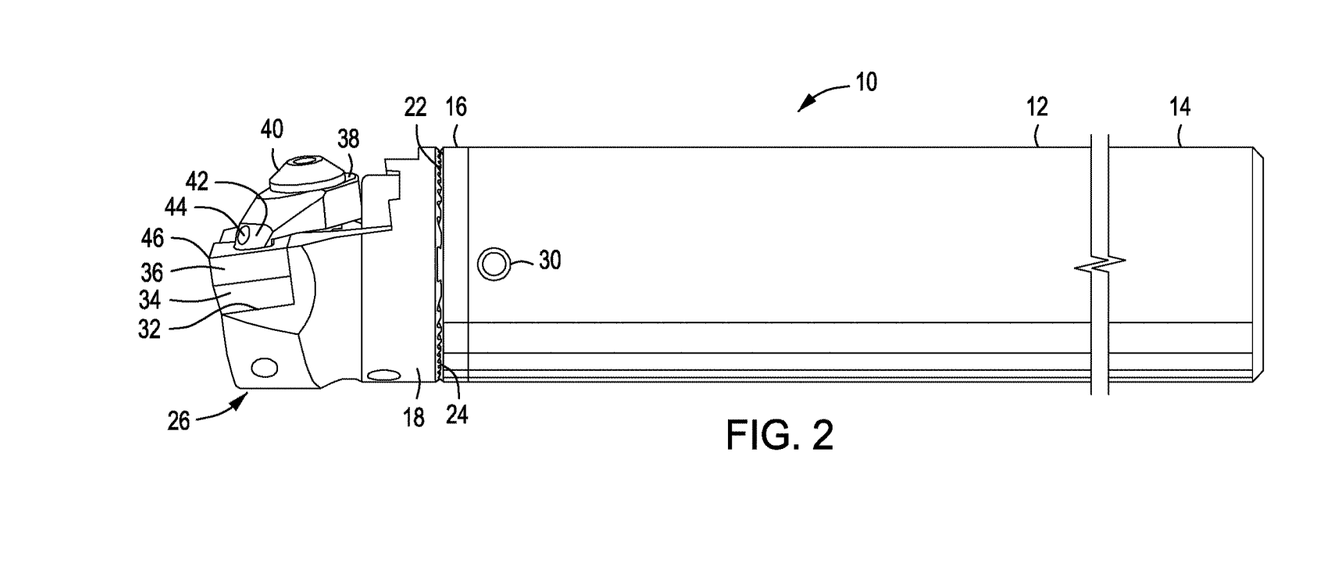
FIG. 2 is a side elevation view showing the through-coolant resonant frequency dampening boring bar and cutter support head of FIG. 1.

Referring now to the drawings and first to the longitudinal elevation views of FIGS. 1 and 2, an adjustable resonant frequency dampening machine tool holder embodying the principles of the present invention is shown generally at 10 and is in the form of a boring bar that is intended to be used to bore internal and ex cylindrical internal surfaces, cut internal or external threads or provide turning or cutting operations on a work-piece being machined. The machine tool holder incorporates an adjustable or tunable anti-vibration or anti-chatter machining adjustment mechanism that can be manually adjusted to substantially eliminate the tool holder resonant frequency vibration that is typically responsible for rough machining of cylindrical surfaces.

Though the through-coolant capability of the tool holder is not necessary for anti-vibration tuning or adjustment, the machine tool holder preferably provides a internal coolant system for conducting pressurized coolant through the machine tool to one or more coolant jet ports that direct a high velocity jet or jets of coolant fluid precisely to the metal cutting interface for cooling and for forcible removal of metal cuttings from the metal cutting interface. The machine tool holder has an elongate tool body or tool shank 12 having a rear end portion 14 that is adapted to be secured to and driven by a rotary machining system. A tool head adapter collar 16 having a reduced diameter projection 17 that is positioned within a forward end section 18 of a tubular wall 20 of the machine tool body 12. The tool head adapter collar 16 defines a grooved forward face 22 that is engaged by a corresponding grooved face 24 of a cutter support head shown generally at 26 in FIG. 2. The tool head adapter collar 16 has a plurality of internally threaded openings 28 that receive threaded fasteners 30 and secure the tool head adapter collar in immoveable relation with the tubular wall structure 20 of the tool support collar 16 of the elongate tool body 12.

The tool support head 26 defines a cutter insert seat 32 on which is seated a cutter support member 34 that provides for support and stability of a replaceable cutter insert 36. An insert clamp member 38 is retained in assembly with the tool support head 26 by a retainer such as a clamp screw 40. The insert clamp member 38 has a clamping portion 42 that engages the replaceable cutter insert 36 and secures it against movement during machining activity. The insert clamp member 38 also defines a coolant jet port 44 from which a jet of pressurized coolant fluid, being conducted through the coolant passages of the tool holder, is directed to the cutting edge 46 of the replaceable cutter insert 36 for cooling of the cutting interface of the cutter insert with the work piece being rotated for machining and for jet force removal of metal cuttings as they are released from the work-piece during machining.

Figures 3, 4:
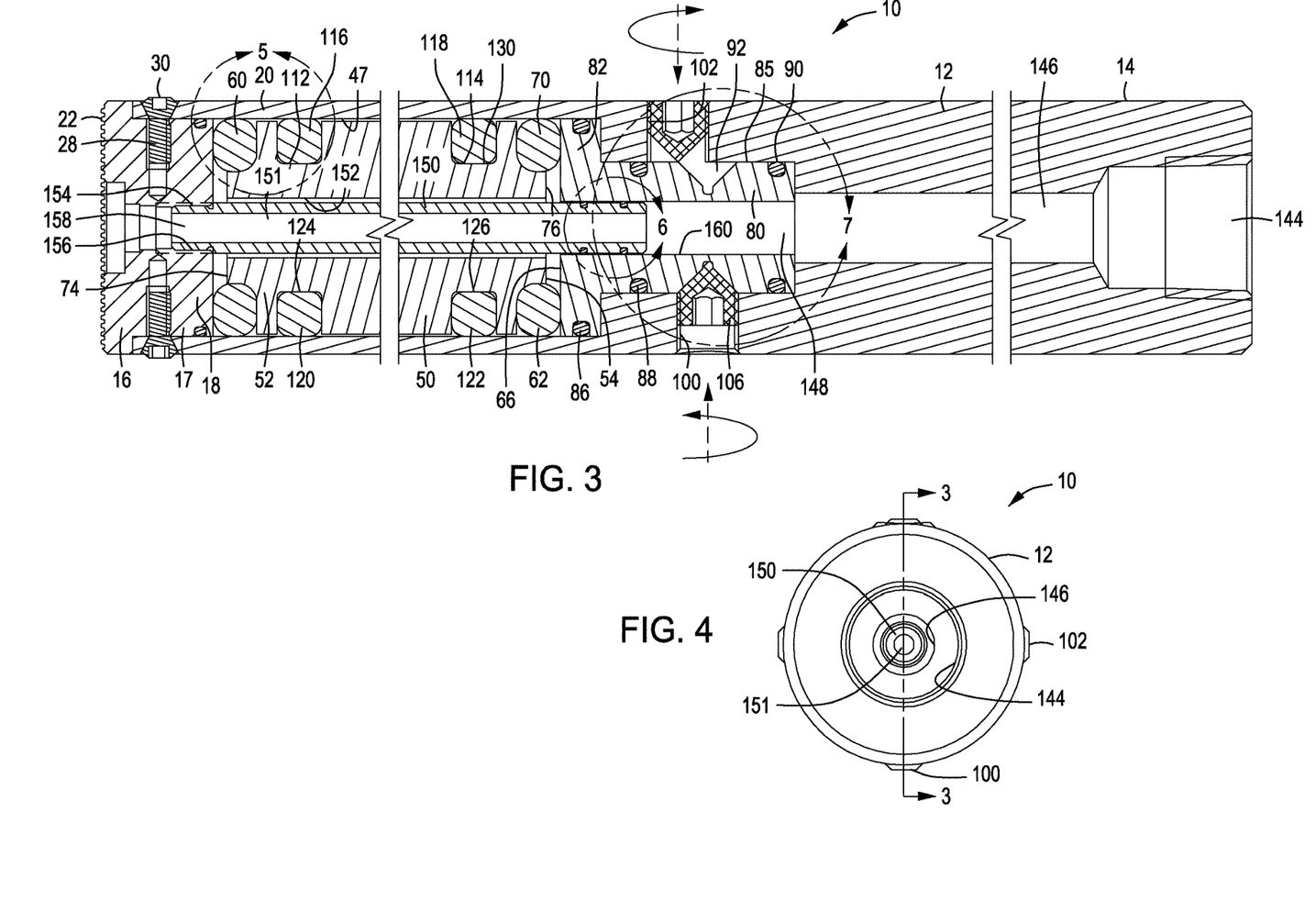
FIG. 3 is a section view taken along line 3-3 of FIG. 4 showing the support and precision adjustment system for the resonant frequency dampening mechanism of the machine tool holder in detail and showing the precision piston moving and frequency tuning mechanism and coolant flow conducting system an intermediate section of the through-coolant machine tool.
FIG. 4 is an end elevation view showing the right or supported end of the through-coolant through coolant resonant frequency machine tool holder or boring bar of FIGS. 1-3.

As best shown in the longitudinal section view of FIG. 3, the elongate tool body 12 has a tubular wall structure 20 which is integral with the elongate tool body 12 and is of generally cylindrical tubular configuration, having a cylindrical internal wall surface 47 defining an elongate dampening chamber 48 within which is located a resonant frequency dampening mass 50. The resonant frequency dampening mass 50 is preferably composed of a dense and heavy material such as carbide or any other material having a density exceeding the density of steel. The resonant frequency dampening mass 50, according to the preferred embodiment and best mode of this invention, has axial end sections 52 and 54 that define retainer recesses 56 and 58 within which are located elastomer dampening ring members 60 and 62 that serve as axial tunable devices. It is necessary that each of the resonant frequency dampening members be disposed in axially positioning engagement with an axial surface within the resonant frequency dampening chamber and in resonant frequency dampening engagement with axial end portions of the dampening mass 50 and that each of the resonant frequency dampening members be maintained under axial compression. The dampening ring members 60 and 62 typically have a circular cross-section configuration in their undeformed state, but are axially deformed by axial compression as shown in FIG. though resilient rings of any other cross-sectional configuration may also be employed.

Figures 5, 6, 7:
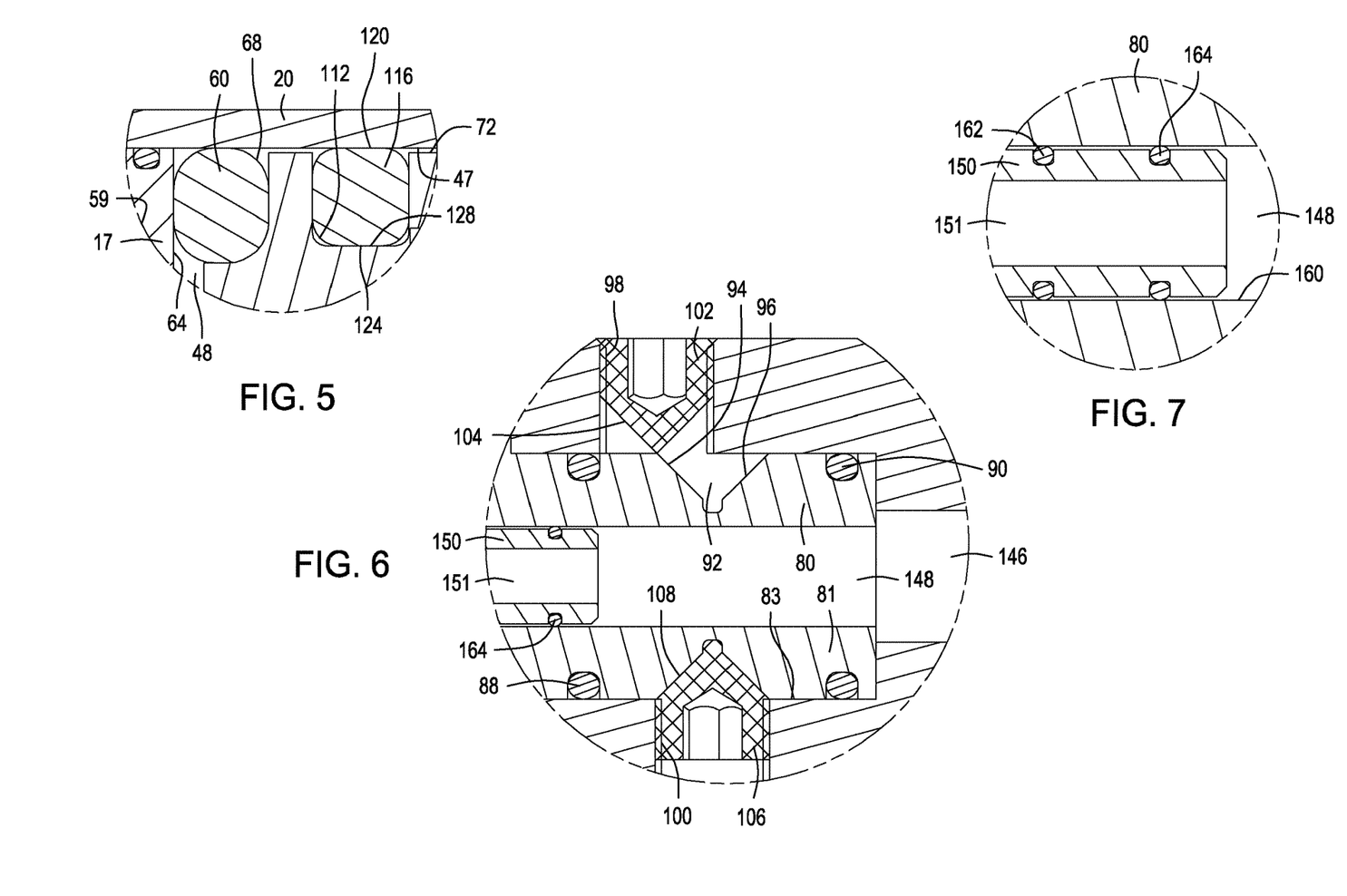
FIG. 5 is a fragmentary longitudinal section view showing part of the frequency dampening mechanism of the through-coolant resonant frequency dampening machine tool holder or boring bar of FIG. 3, particularly with regard to the resilient support for the dense dampening mass.
FIG. 6 is a fragmentary longitudinal section view showing the precision piston adjustment mechanism of FIG. 3 in greater detail and also showing the seals of a coolant tube end within a longitudinal passage of the piston member.
FIG. 7 is a fragmentary longitudinal section view showing an end portion of the coolant tube of FIG. 3 having sealing members to prevent coolant fluid leakage from the coolant flow system into the vibration dampening chamber of the tool.

As shown in FIG. 3 and in the enlarged partial section view of FIG. 5, the axial tunable dampening ring 60 is axially compressed between a rearwardly facing generally planar surface 64 of the reduced diameter projection 17 of the tool support collar 16 and an annular generally planar surface 66 of the ring retainer recess 56 of the resonant frequency dampening mass 50, and are composed of an elastomeric material such as rubber, elastic polymer material or any other suitable material having resilient or elastomeric qualities. The dampening ring members define outer peripheral surfaces 68 and 70, respectively, that engage the internal cylindrical surface 47 of the generally cylindrical tubular wall 20 of the elongate tool body 12 and assist in the support of the anti-vibration mass 50 with its outer peripheral surface 72 and each of its axial end surfaces 74 and 76 in spaced relation with the inner surface 47 of the generally cylindrical wall 20 elongate tool body 12. Axial tunable dampening ring 62, shown in FIGS. 3 and 8, also is typically provided with a generally circular cross-sectional configuration in its uncompressed state and is maintained under adjustable axial compression by a circular, generally planar surface 78 of an internal moveable tuning member 80 also referred to as a tuning piston member. The tuning member 80 is linearly moveable and is mechanically actuated for its movement in either axial direction.

The tuning piston member is received for axial tuning movement within a piston chamber 81 having a cylindrical internal sealing surface 83. The tuning piston member 80 has a generally cylindrical piston body 85 that is sealed with respect to the piston chamber and has a circular flange 82 that is located within the dampening chamber employs a circular piston seal 86 to maintain dynamic sealing between the piston member and the internal surface 47 of the generally cylindrical wall 20 of the tool body 12 within the elongate dampening chamber 48. The position of the piston member 80 within the elongate dampening chamber 48 determines the amount of compression of the axial tunable dampening rings 60 and 62 and thus also determines the position and dampening characteristics of the dampening mass 50. The tuning piston member 80 defines annular seal grooves within which are located annular seal members 86, 88 and 90 for maintaining the piston member in sealed relation within the tool body 12 at all of the adjusted positions of the piston member. These seals permit axial adjustment movement of the piston member 80 within the tool body and dampening chamber 48 for achieving selective precision positioning of the dampening mass 50 within the dampening chamber.

Figure 8:
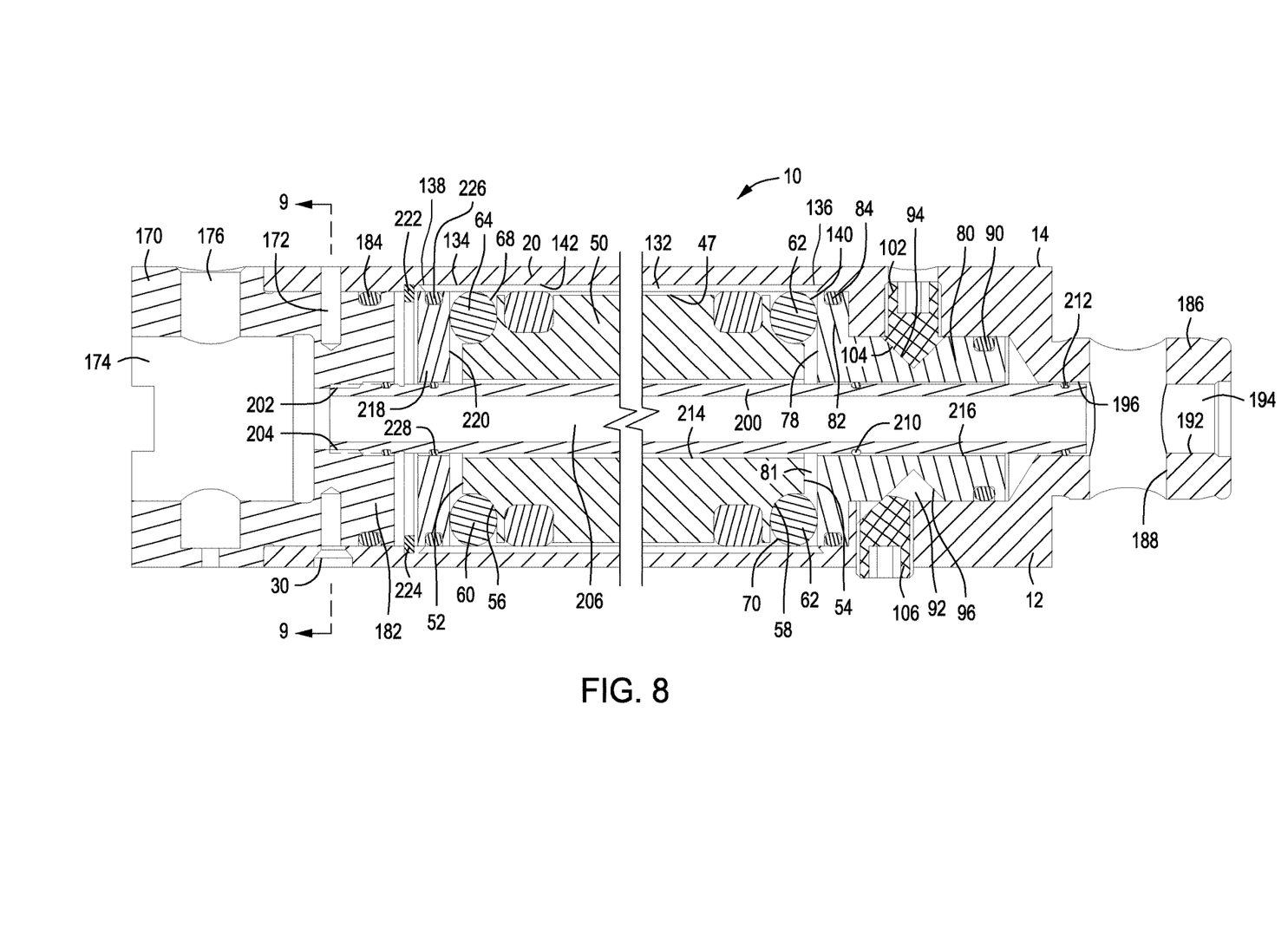
FIG. 8 is a longitudinal section view of an alternative embodiment of the present invention showing a generally cylindrical lining of dense material being interlocked within the tool body and defining the internal wall surface of the vibration dampening chamber of the tool.

It is appropriate for the piston member to be adjustable or tunable in both axial directions in order to achieve precision tuning of the resonant frequency dampening mechanism of the machine tool. This feature of the resonant frequency dampening machine tool is accomplished by providing the piston member 80 with oppositely angulated piston drive surfaces which may have the form of a tuning piston adjustment or tuning groove 92 having opposed tapered surfaces 94 and 96 that may each have a taper of about 45° with respect to the longitudinal axis of the machine tool. The tool body 12 defines a pair of axially offset internally threaded tuning actuator openings 98 and 100 each receiving a tuning actuator member having a tapered drive surface for engaging and imparting linear driving movement to the tuning piston member. In this case the tuning actuator member has the form of a tuning actuator screw 102, shown particularly in FIGS. 3, 6 and 8, which has a tapered drive surface 104 corresponding to the taper of the surface 94 of the tuning adjustment groove 92 and is referred to herein as the "forward" tuning screw in that it is rotated clockwise to cause cam-like reaction of the tapered surface 104 of the tuning screw with the tapered surface 94 of the tuning groove to impart forward movement of the tuning piston member 80, to the left, as shown in FIGS. 3, 6 and 8. This "forward" movement of the tuning piston member drives the substantially planar face 66 of the piston flange member 82 forwardly or to the left, increasing the compression force that is applied by the piston flange member to the elastomer dampening ring member 62. This compression force is translated through the elastomer dampening ring member 62 to the resonant frequency dampening mass 50 and through the resonant frequency dampening mass 50 to increase the compression of the elastomer dampening ring member 60.

It should be appreciated that tuning of the resonant frequency dampening system of the present invention typically requires precision selective movement of the tuning piston member 80 "forwardly" or "rearwardly" to adjust the amount of axial compression that is applied to the elastomer dampening ring members 60 and 62. If rearward movement of the tuning piston member is needed the "rearward" tuning screw 106 within the internally threaded opening 100 is rotated clockwise to cause the tapered surface 108 of the "rearward" tuning screw 106 to react with the tapered groove surface 96 to drive the tuning piston member to the left, rearwardly, thus moving the tuning piston member away from the right or rear end portion of the resonant frequency dampening mass 50. This rearward tuning movement simply diminishes but does not remove compression of the elastomer dampening ring members 60 and 62. As shown in FIGS. 3 and 6, the tuning piston member 80 is shown at its maximum rearward position relative to the tool body 12.

Though axial tunable devices 60 and 62 are described above, it is also deemed appropriate to provide the resonant frequency dampened machine tool 10 with one or more diametrical tuning devices that function in concert with the axial tunable devices to substantially eliminate the vibration that is induced to the tool by machining a rotating work piece. As shown in FIGS. 3, 5 and 8 the resonant frequency dampening mass 50 defines a pair of annular external grooves 112 and 114 each having a generally rectangular cross-sectional configuration with rounded corners. Annular diametrical tunable devices 116 and 118, each having a generally rectangular cross-sectional configuration are positioned within the external grooves 112 and 114. The diametrical tuning devices are each composed of a resilient material that is identical to or similar to the resilient material of the axial tunable devices 60 and 62 and have a generally rectangular cross-sectional configuration with rounded corners, generally closely fitting within the annular grooves 112 and 114. Externally, the generally cylindrical outer peripheral surface segments 120 and 122 define generally cylindrical outer peripheral surface segments 120 and 122 that engage the internal cylindrical surface 47 of the tubular wall 20.

The radial dimension of the diametrical tunable devices is sufficient that the generally cylindrical outer peripheral surface segments 120 and 122 and generally cylindrical internal surface segments 124 and 126 are each in compressive engagement, respectively, with the internal cylindrical surface 47 of the tubular wall 20 of the tool housing and with the generally cylindrical surface segments 128 and 130 within the annular grooves 112 and 114 of the resonant frequency dampening mass 50. Thus, the diametrical tunable devices achieve precision centering of the resonant frequency dampening mass 50 within the dampening chamber 48 and maintain the outer surface of the resonant frequency dampening mass in spaced relation with the internal generally cylindrical surface 47 of the tubular wall 20.

Though the tubular wall 20 is preferably in the form shown in FIGS. 3 and 5, according to another embodiment of the present invention, as shown in FIG. 8, the internal cylindrical wall surface 47 is defined by a tubular wall lining 132 that is composed of a dense material such as lead having end portions 134 and 136 that are interlocked within undercut recesses 138 and 140 at the ends of a generally cylindrical lining recess 142 The dense material may be defined by a metal such as lead or by any other metal, non-metal, filled polymer composition or the like. To ensure that the lining material is positively retained within the lining recess 142 the internal surface region 142 of the tubular wall 30 is grooved or scored to define an internal roughened surface providing for peripheral interlocking of the dense lining 132 with the generally cylindrical internal surface of the lining recess 142.

If lead is the dense lining material of choice, a method for applying it as an inner layer of the tubular wall 20 can be accomplished by machining the internal portion of the wall 20 to create the generally cylindrical lining recess 142 and the undercut ends 138 and 140. The tubular wall 20, within the generally cylindrical lining recess 142, is then roughened by a machining operation such as knurling, scoring etc. to ensure a locking relation of the dense lining within the lining recess. With the tubular wall supported vertically, and perhaps heated, molten lead is poured into the interior of the tubular wall 20, filling the lining recess, including the undercut ends and roughened or grooved internal surface of the recess with molten lead. If desired, a suitable core may be placed within the tubular wall 20 to minimize the volume of molten lead or other lining material that is needed to fill the interior of the tubular wall 20.

After the lead material has become cooled and solidified, the interior of the lead lining is machined to form a dense lining for the tubular wall 20 that has a precision internal cylindrical surface 47 of the same dimension as the original internal cylindrical surface of the tubular wall of the elongate body of the machine tool. The roughened internal surface of the lining recess 142 and the undercut ends 138 and 140 of the lining recess ensure permanent interlocked support of the dense inner layer 132 of the tubular wall 20. This dense lining, located circumferentially about and in radially spaced relation with the resonant frequency dampening mass 50 and, extending substantially the entire axial length of the resonant frequency dampening mass and dampening chamber, enhances the resonant frequency dampening characteristics of the machine tool.

Figure 9:
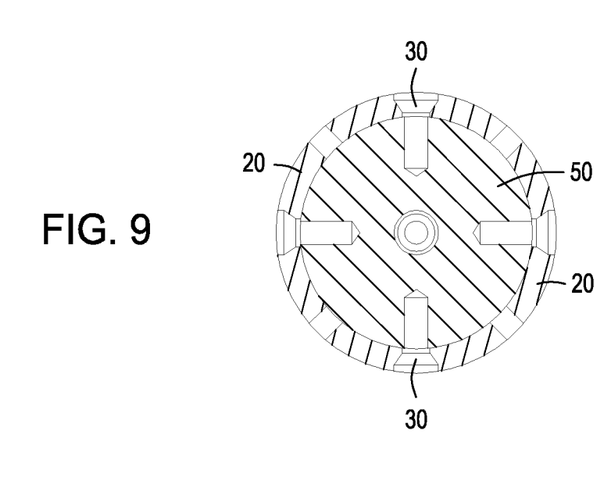
FIG. 9 is a transverse section view taken along line 9-8 of FIG. 8, showing mounting of an adapter collar to the forward end portion of the elongate tool body.

It is desirable that the resonant frequency dampened machine tool of the present invention have a cooling capability and that it have a through-coolant capability for conducting a flow of pressurized coolant fluid from a coolant pump of a machining system through a flow passage of the interior of the machine tool and to deliver the pressurized coolant fluid to the metal cutting interface of the machine tool and a work-piece being rotated and machined. According to the present invention a through-coolant system may have different forms, FIGS. 3, 4, 6 and 7 showing one embodiment, which is considered the preferred embodiment and best mode. FIGS. 8 and 9 show an alternative embodiment of the through-coolant system of the machine tool.

Referring now to FIGS. 3, 4, 6 and 7, the rear end portion 14 of the machine tool body or tool shank 12 defines a coolant fluid inlet connection having an internally threaded coolant fitting receptacle 144 that receives a coolant fitting, not shown, for connection of a pressurized coolant fluid supply line that extends from the coolant fluid discharge outlet of the coolant pump of a machining system to the resonant frequency dampened machine tool of the present invention. The coolant fitting receptacle 144 is in communication with a coolant flow passage 146 located centrally of the tool body 12 which supplies pressurized coolant fluid to a coolant flow passage 148 that extends centrally through the tuning piston member 80 and is in fluid communication with the dampening chamber 48.

A coolant tube 150 defining a coolant flow passage 151 extends through a central passage 152 of the resonant frequency dampening mass 50 and has a forward externally threaded end 154 that is in threaded engagement with an internally threaded coolant tube receptacle 156 of the tool support collar member 16. The coolant flow passage 151 is in communication with a coolant flow passage 158 of the tool support collar member 16 for conducting a flow of pressurized coolant fluid through the tool support collar to a cutter support head that is mounted to the grooved forward face of the tool support collar as shown generally at 26 in FIGS. 1 and 2. As shown in FIGS. 3 and 7 the rear end portion of the coolant tube 150 is located within the coolant flow passage 148 of the tuning piston member 80 and is sealed with respect to the cylindrical surface 160 of the coolant flow passage 148 by axially spaced O-ring seals 162 and 164 that are contained within annular external seal grooves of the coolant tube 150.

Figure 10:
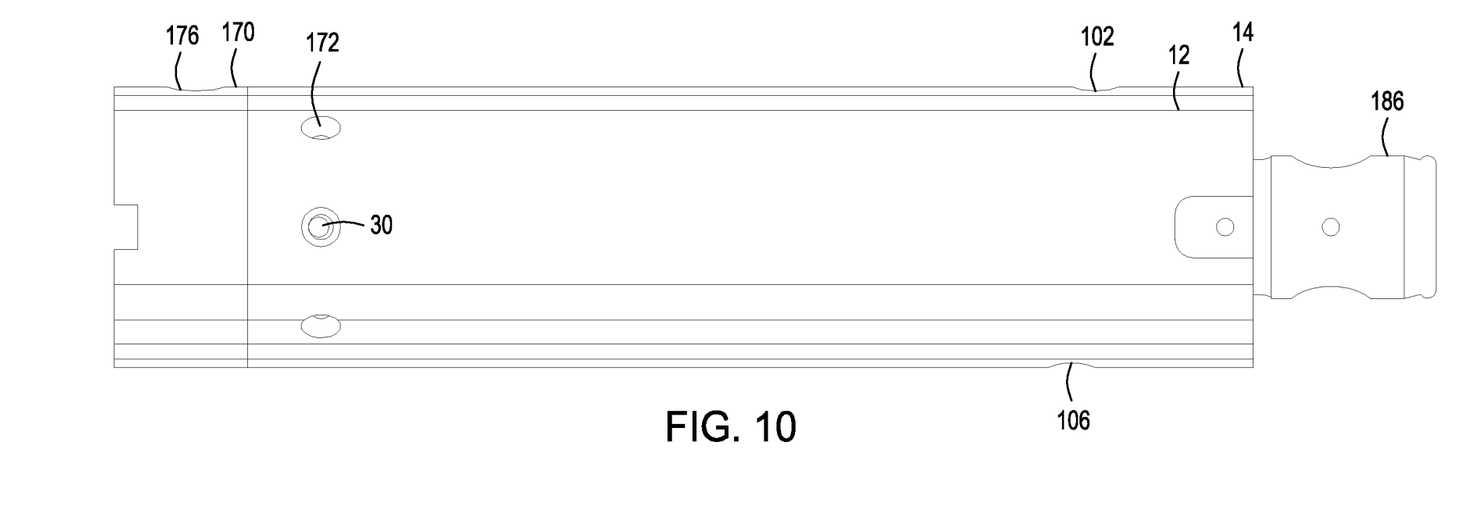
FIG. 10 is a side elevation view showing the machine tool of FIGS. 8 and 9.
Figure 11:
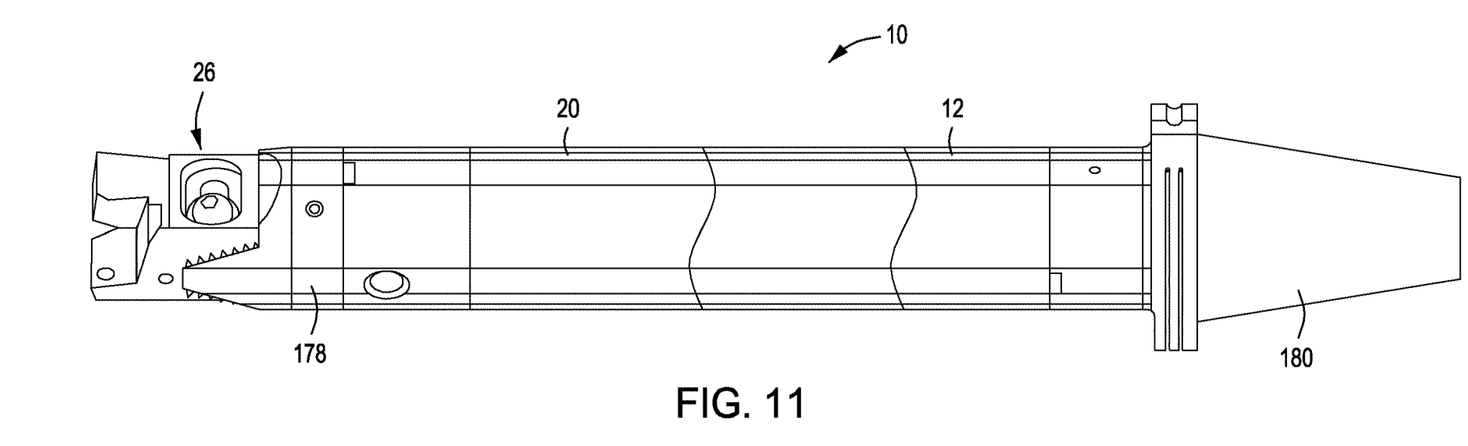
FIG. 11 is a side elevation view showing the resonant frequency dampening machine tool of FIGS. 8-10 having adapter members mounted to the rearward and forward ends thereof, the forward adapter providing support for a cutter support head.

The alternative embodiment shown in FIGS. 8-10 incorporates features that are common to the embodiment of FIGS. 3, 4, 6 and 7 and which are referred to by the same reference numbers. A cutter head support collar 170 is secured to the tubular wall 20 of the elongate tool housing 12 by means of adapter collar screws 30 and by one or more collar alignment pin 172. The cutter head support collar 170 defines an adapter receptacle 174 within which any of a number of standard machine tool adapters, such as shown at 178 and 180 of the forward and rear end portions of FIG. 11 is releasably received. The adapters are secured by adapter retainer members that are extended through adapter retainer receiving recesses 176 and securing the positioning and support structure of adapter members within the adapter receptacles. The cutting head support collar 170 defines a generally cylindrical projection 182 having an annular seal member 184 that establishes a seal with the internal surface 47 of the tubular wall 20 to assist in prevention of coolant leakage from the coolant flow system into the dampening chamber 48.

At the rear end portion of the tool body 12, an axial projection 186 being an external adapter mount for an adapter member having an internal receptacle for receiving the external adapter mount, has a transverse adapter retainer receptacle or bore 190 for receiving a retainer member that secures the adapter member to the external adapter mount. The axial projection 186 also defines an axial passage section 192 that forms a section of a coolant flow passage 194 and is axially aligned with respect to a coolant tube passage section 196.

A coolant tube 200 has a forward externally threaded end 202 that is engaged within an internally threaded receptacle 204 of the cutting head support collar 170 and defines a coolant flow passage 206 that conducts pressurized coolant fluid from the inlet passage section 194 through the resonant frequency dampening tool 10 to the cutting head support collar 170 where it is directed as one or more high velocity jet or jets of coolant that strike the cutting interface of a metal cutting insert with a work-piece being machined. Annular seal members 208, 210 and 212 establish sealing between the external surface of the coolant tube 200 and tool components such as the cutting head support collar 170, the tuning piston member 80 and the tool body 12 to ensure that the pressurized coolant fluid does not leak into the dampening chamber 48 or the tuning piston chamber 81. The coolant tube 200 extends through centrally oriented axial passages 214 of the resonant frequency dampening mass 50 and 216 of the tuning piston member 80, with the rear end portion of the coolant tube being located within the passage section 196 of the tool body 12 as mentioned above, so that both ends of the coolant tube 200 are immoveable within the machine tool 10. This feature minimizes the potential for leakage of the pressurized coolant fluid from the coolant flow system.

As shown in FIG. 8, a dampening mass retainer member 218 has a generally planar rearward facing surface 220 that is engaged by the elastomer tunable resonant frequency dampening member 60. The retainer member 218 is essentially free-floating within the dampening chamber 52 but has its forward axial movement toward the cutting head support collar 170 resisted by a retainer ring 222, such as a metal snap-ring member that is received within an annular retainer groove 224 within the tubular wall 20. Axial movement of the dampening mass retainer member 218 in the rearward direction is resisted by the compressive force that is applied to the rearward facing surface 220 of the retainer member 218 by the tunable elastomer dampening ring member 60. The dampening mass retainer member is sealed with respect to the inner wall surface 47 of the tubular wall 20 by an annular seal member 226 which is located within an outer peripheral annular seal groove of the dampening mass retainer member 218. Though FIG. 8 shows the tubular wall 20 to have a dense internal lining 132, it should be borne in mind that in many cases the dense internal lining may not be needed to achieve efficient resonant frequency dampening of the machine tool.

Operation

As a machining operation, such as internal or external threading, boring or turning, is initiated the operator of a machining system or lathe to which the resonant frequency dampened machine tool 10 of the present invention is mounted may experience high pitched squeaking or chattering as a metal cutting insert is moved into cutting relation with a rotating work-piece. When this condition occurs, invariably the result would be generation of a poor quality or roughened machined surface or poor quality part, due to the resonant frequency vibration of the machine tool, if the machining operation were to continue. Fortunately, the machine tool of the present invention provides a machine operator with the capability to make precision axial and diametrical adjustments of the resonant frequency dampening system of the machine tool, substantially eliminating any vibration, high pitched noise or chattering during machine and resulting in the machining of high quality surfaces and parts.

As shown in FIGS. 3 and 6, the tuning piston member 80 the rearward tuning screw 106 has been rotated clockwise to its maximum extent such that its tapered or conical surface 108 is fully seated within the annular adjustment groove 92 engaging both of the tapered surfaces 94 and 96 of the adjustment groove and locking the tuning piston member 80 at its maximum rearward position. In order to permit force transmitting forward movement of tuning piston member 80 from the locked position shown in FIGS. 3 and 6 it will be necessary to rotate the tuning screw 106 counterclockwise to withdraw the tapered surface 108 of the tuning piston adjustment groove 92 from engagement with the tapered surfaces 94 and 96 of the annular tuning piston adjustment groove 92. After the tuning screw 106 has been retracted from its locking position, forward movement of the tuning piston member is accomplished by rotating the forward tuning screw 102 clockwise, driving the tapered surface 104 of the tuning screw against the annular tapered surface 94 of the annular tuning piston adjustment groove 92 and causing a camming reaction of surfaces 94 and 104 that forces the tuning piston member 80 to the left, adding to the axial compression of the elastomer dampening ring members 60 and 62 that serve as axial resonant frequency tuning devices of the resonant frequency dampened machine tool 10. If the position of the tuning piston is forward of the locked position shown in FIGS. 3 and 6, resonant frequency adjustment can be accomplished by moving the tuning piston member 80 forwardly or to the rear.

For rearward movement of the tuning piston, to relieve piston pressure on the axial adjustment devices 60 and 62, the tuning screw 106 is rotated clockwise causing the tapered or conical surface 108 of the tuning screw to forcibly engage the annular tapered surface 108 of the annular tuning piston adjustment groove 92 and resulting in a surface to surface camming action that applies a rearwardly directed resultant force moving the tuning piston 80 in the rearward direction and increasing mechanical pressure of the axial adjustment device 62. This tuning piston movement to accomplish resonant frequency tuning is typically very slight and it causes very slight forward movement of the resonant frequency dampening mass 50 within the dampening chamber. The tuning screw 102 or 106 that is rotated for resonant frequency tuning will secure the tuning piston against inadvertent movement after the resonant frequency tuning operation has been completed.

In the event machine tool chattering or screeching is observed by operating personnel of the machining system at the start of a machining operation such is an indication that resonant frequency tuning of the resonant frequency dampened machine tool is needed. Resonant frequency adjustment is typically accomplished by trial and error adjustment movement of the tuning piston, though a machinist in control of a machining system will quickly become adept at quickly and accurately adjusting the tuning mechanism to achieve optimum machining producing quality machining.

The axial resonant frequency adjustment devices 60 and 62 and the diametrical resonant frequency adjustment devices 116 and 118 function in concert to achieve optimum axial positioning of the resonant frequency dampening mass 50 and precision centralized positioning of the dampening mass so that the outer periphery of the dampening mass is always disposed in spaced relation with the generally cylindrical internal wall surface 47 of the elongate dampening chamber 48 due to radial compression of the resonant frequency adjustment devices 116 and 118. Also, the annular, generally planar outer peripheral surfaces 120 of the resonant frequency adjustment devices 116 and 118 are forced by compression of the resilient material from which they are composed to provide the dampening mass 50 with frictional resistance to linear movement in both the forward and rearward directions within the dampening chamber, thus enhancing the resonant frequency dampening characteristics of the tunable or adjustable dampening system of the machine tool of the present invention.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A through-coolant resonant frequency dampened machine tool having a resonant frequency tuning capability, comprising:
    an elongate machine tool body having a rear end portion adapted for support and machining movement by a machining system and having a forward end portion adapted for support of a cutting head to which a replaceable metal cutting insert is mounted;
    a dampening chamber being defined within said elongate machine tool body and having an elongate internal wall surface, a rear end chamber surface and a forward end chamber surface;
    a resonant frequency dampening mass being located within said dampening chamber and having an elongate external surface being disposed in spaced relation with said elongate internal wall surface;
    axially tunable dampening devices engaging respective forward and rear end portions of said resonant frequency dampening mass and having force transmitting engagement with said rear end of said dampening chamber and said forward end of said dampening chamber;
    diametrically tunable dampening devices having force transmitting engagement with said resonant frequency dampening mass and with said elongate internal wall surface of said dampening chamber, said diametrically tunable devices maintaining said resonant frequency dampening mass in spaced relation with said elongate internal wall surface and resisting linear movement of said resonant frequency dampening mass within said dampening chamber;
    a moveable tuning member within said tool body having a tuning surface disposed in engagement with one of said axially tunable devices, said moveable tuning member defining first and second oppositely angulated surfaces; and
    a tuning actuator member being movably supported by said elongate machine tool body and being selectively moved for tuning movement of said resonant frequency dampening mass within said elongate machine tool body to substantially eliminate the resonant frequency of said machine tool during machining activity.

2. The through-coolant resonant frequency dampened machine tool of claim 1, comprising:
    a tool head adapter collar being mounted to said forward end portion of said elongate machine tool body and having a rearwardly facing surface; and
    said axially tunable dampening device at said forward end of said resonant frequency dampening mass being engaged by said rearwardly facing surface of said tool head adapter collar.

3. The through-coolant resonant frequency dampened machine tool of claim 1, comprising:
    said dampening chamber having a generally cylindrical internal wall surface and forward and rear end surfaces;
    said resonant frequency dampening mass defining annular axially tuning recesses at said forward and rear ends thereof;
    said axially tunable dampening devices being of annular configuration and each being positioned within one of said annular axially tuning recesses of said resonant frequency dampening mass and having contact with said generally cylindrical internal wall surface and with said forward and rear end surfaces of said dampening chamber; and
    said moveable tuning member defining said rear end surface of said dampening chamber.

4. The through-coolant resonant frequency dampened machine tool of claim 3, comprising:
    said resonant frequency dampening mass defining annular diametrical recesses located between said annular axial tuning recesses; and
    annular diametrical tuning devices being located within said annular axial tuning recesses and having compressive engagement with said generally cylindrical internal wall surface.

5. The through-coolant resonant frequency dampened machine tool of claim 4, comprising:
    said annular axial tuning devices and said annular diametrical tuning devices each being composed of resilient material and collectively providing axial and diametrical support for said resonant frequency dampening mass within said dampening chamber.

6. The through-coolant resonant frequency dampened machine tool of claim 1, comprising:
    said elongate machine tool body, said resonant frequency dampening mass, said cutting head and said moveable tuning member each defining coolant fluid flow passages for conducting coolant fluid through said resonant frequency dampened machine tool for cooling and cleaning of the metal cutting interface thereof with a rotating work piece.

7. The through-coolant resonant frequency dampened machine tool of claim 6, comprising:
    said resonant frequency dampening mass defining a central passage therethrough;
    a tool head adapter collar being mounted to said elongate machine tool body for support of a tool head;
    a tubular coolant member having forward and rear ends with said forward end being mounted to said tool head adapter collar, said tubular coolant member extending through said central passage of said resonant frequency dampening mass and being sealed to said moveable tuning member.

8. The through-coolant resonant frequency dampened machine tool of claim 6, comprising:
    said elongate machine tool body defining a generally cylindrical internal chamber being open to said dampening chamber;
    said tuning member having a generally cylindrical body portion received within said generally cylindrical internal chamber and being sealed to said elongate machine tool body;
    an annular tuning groove being defined by said generally cylindrical body portion of said tuning member and having oppositely angulated tapered surfaces;
    a pair of axially offset internally threaded openings being provided in said elongate machine tool body;
    externally threaded tuning screws being received by said axially offset internally threaded openings and having conical drive surfaces oriented for selective driving engagement with respective oppositely angulated tapered surfaces, a first of said tuning screws being rotated clockwise to drive said tuning member forwardly to increase mechanical pressure of said internal tuning member on said axial tuning member and said resonant frequency dampening mass and a second of said threaded tuning screws being rotated clockwise to drive said internal tuning member rearwardly to decrease mechanical pressure of said internal tuning member on said axial tuning member and said resonant frequency dampening mass.

9. The through-coolant resonant frequency dampened machine tool of claim 1, comprising:
   a tuning member being moveable within said elongate machine tool body and defining said rear end chamber surface;
   one of said axial tunable devices having force transmitting engagement with said rear end chamber surface of said tuning member; and
   said tuning actuator member being exposed externally of said elongate machine tool body and having actuating engagement with said tuning member.

10. The through-coolant resonant frequency dampened machine tool of claim 1, comprising:
    a tubular wall lining of dense material having a density exceeding the density of steel being located within said dampening chamber and having a generally cylindrical inner wall surface defining a portion of said dampening chamber, said tubular wall lining enhancing resonant frequency dampening of said machine tool.

11. The through-coolant resonant frequency dampened machine tool of claim 10, comprising:
    a generally cylindrical internal recess being defined within said elongate machine tool body and having undercut axial ends and having a roughened internal surface; and
    said lining of dense material filling said generally cylindrical internal recess and said undercut axial ends and establishing interlocking relation with said roughened internal surface; and
    said lining having a generally cylindrical internal surface defining an internal surface of said dampening chamber.

12. A through-coolant resonant frequency dampened machine tool having a resonant frequency tuning capability, comprising:
    an elongate machine tool body having a rear end portion adapted for support and machining movement by a machining system and having a forward end;
    a cutting head support collar being mounted to said forward end of said machine tool body and adapted for support of a cutting head to which a replaceable metal cutting insert is mounted;
    a dampening chamber being defined within said elongate machine tool body and having an elongate internal generally cylindrical wall surface, a rear end chamber surface and a forward end chamber surface;
    a resonant frequency dampening mass being located within said dampening chamber and having an elongate external surface being disposed in spaced relation with said elongate internal generally cylindrical wall surface;
    forward and rearward axially tunable dampening devices engaging respective forward and rear end portions of said resonant frequency dampening mass and having force transmitting engagement with said rear end of said dampening chamber and said forward end of said dampening chamber;
    forward and rearward diametrically tunable dampening devices having force transmitting engagement with said resonant frequency dampening mass and with said elongate internal wall surface of said dampening chamber, said diametrically tunable devices maintaining said resonant frequency dampening mass in spaced relation with said elongate internal wall surface and resisting linear movement of said resonant frequency dampening mass within said dampening chamber;
    a moveable tuning member within said tool body having a tuning surface disposed in engagement with said axially tunable device, said moveable tuning member defining first and second oppositely angulated surfaces; and
    a tuning actuator member being supported for linear movement within said elongate machine tool body and being selectively moved for actuation of tuning movement of said resonant frequency dampening mass within said elongate machine tool body to substantially eliminate the resonant frequency of said machine tool during machining activity.

13. The through-coolant resonant frequency dampened machine tool of claim 12, comprising:
    a tuning actuator receptacle being defined within said elongate machine tool body and defining a generally cylindrical internal surface being open to said dampening chamber;
    a tuning actuator having a portion thereof positioned for movement within said tuning actuator receptacle and having a portion thereof located for movement within said dampening chamber, said tuning actuator having opposed angulated surfaces defining a tuning groove; and
    a pair of longitudinally offset actuator members being supported by said elongate machine tool body and being selectively moved to engage and cause reaction thereof with said opposed angulated surfaces of said tuning groove thus selectively moving said tuning actuator forwardly and enhancing mechanical pressure thereof with said resonant frequency dampening mass.

14. The through-coolant resonant frequency dampened machine tool of claim 12, comprising:
    a tool head adapter collar being mounted to said forward end portion of said elongate machine tool body and having a rearwardly facing surface;
    said axially tunable dampening device at said forward end of said resonant frequency dampening mass being engaged by said rearwardly facing surface of said tool head adapter collar;
    said dampening chamber having a generally cylindrical internal wall surface and forward and rear end surfaces;
    said resonant frequency dampening mass defining annular axially tuning recesses at said forward and rear ends thereof;
    said axially tunable dampening devices being of annular configuration and each being positioned within one of said annular axially tuning recesses of said resonant frequency dampening mass and having contact with said generally cylindrical internal wall surface and with said forward and rear end surfaces of said dampening chamber; and
    said moveable tuning member defining said rear end surface of said dampening chamber.

15. The through-coolant resonant frequency dampened machine tool of claim 14, comprising:
    said resonant frequency dampening mass defining annular diametrical recesses located between said annular axial tuning recesses;

annular diametrical tuning devices being located within said annular axial tuning recesses and having compressive engagement with said generally cylindrical internal wall surface;

said annular axial tuning devices and said annular diametrical tuning devices each being composed of resilient material and collectively providing axial and diametrical support for said resonant frequency dampening mass within said dampening chamber; and said elongate machine tool body, said resonant frequency dampening mass, said cutting head and said moveable tuning member each defining coolant fluid flow passages for conducting coolant fluid through said resonant frequency dampened machine tool for cooling and cleaning of the metal cutting interface thereof with a rotating work piece.

16. The through-coolant resonant frequency dampened machine tool of claim 15, comprising:

said resonant frequency dampening mass defining a central passage therethrough;

a tool head adapter collar being mounted to said elongate machine tool body for support of a tool head; and a tubular coolant member having forward and rear ends with said forward end being mounted to said tool head adapter collar, said tubular coolant member extending through said central passage of said resonant frequency dampening mass and being sealed to said moveable tuning member.

17. The through-coolant resonant frequency dampened machine tool of claim 12, comprising:

a tuning member being moveable within said elongate machine tool body and defining said rear end chamber surface;

one of said axial tunable devices having force transmitting engagement with said rear end chamber surface of said tuning member;

said tuning actuator member being exposed externally of said elongate machine tool body and having actuating engagement with said tuning member;

said elongate machine tool body defining a generally cylindrical internal chamber being open to said dampening chamber;

said tuning member having a generally cylindrical body portion received within said generally cylindrical internal chamber and being sealed to said elongate machine tool body;

an annular tuning groove being defined by said generally cylindrical body portion of said tuning member and having oppositely angulated tapered surfaces;

a pair of axially offset internally threaded openings being provided in said elongate machine tool body; and externally threaded tuning screws being received by said axially offset internally threaded openings and having conical drive surfaces oriented for selective driving engagement with respective oppositely angulated tapered surfaces, a first of said tuning screws being rotated clockwise to drive said tuning member forwardly to increase mechanical pressure of said internal tuning member on said axial tuning member and said resonant frequency dampening mass and a second of said threaded tuning screws being rotated clockwise to drive said internal tuning member rearwardly to decrease mechanical pressure of said internal tuning member on said axial tuning member and said resonant frequency dampening mass.

18. The through-coolant resonant frequency dampened machine tool of claim 12, comprising:

a tubular wall lining of dense material having a density exceeding the density of steel being located within said dampening chamber and having a generally cylindrical inner wall surface defining a portion of said dampening chamber, said tubular wall lining enhancing resonant frequency dampening of said machine tool;

a generally cylindrical internal recess being defined within said elongate machine tool body and having undercut axial ends and having a roughened internal surface;

said lining of dense material filling said generally cylindrical internal recess and said undercut axial ends and establishing interlocking relation with said roughened internal surface; and said lining having a generally cylindrical internal surface defining an internal surface of said dampening chamber.

\* \* \* \* \*